United States Patent
Tanabe

[19]

[11] Patent Number: 6,120,243
[45] Date of Patent: Sep. 19, 2000

[54] PUMP HOUSING HAVING A HIGH PRESSURE PORTION AND A LOW PRESSURE PORTION

[75] Inventor: Michiaki Tanabe, Nihommatsu, Japan

[73] Assignee: NOK Corporation, Tokyo, Japan

[21] Appl. No.: 09/050,981

[22] Filed: Mar. 31, 1998

[30] Foreign Application Priority Data

May 15, 1997 [JP] Japan ................................ 9-140897
Jul. 15, 1997 [JP] Japan ................................ 9-205352

[51] Int. Cl.[7] ................................................ F01D 25/22
[52] U.S. Cl. .......................... 415/112; 415/113; 415/111; 415/176; 415/203; 415/214.1; 415/229
[58] Field of Search ................................ 415/111, 112, 415/113, 175, 176, 214.1, 229, 230, 203; 384/297, 299, 441, 397; 417/364, 366

[56] References Cited

U.S. PATENT DOCUMENTS

| | | | |
|---|---|---|---|
| 3,671,137 | 6/1972 | Ball | 415/104 |
| 4,958,988 | 9/1990 | Regev | 417/53 |
| 4,971,525 | 11/1990 | Nakayoshi et al. | 417/201 |
| 5,163,812 | 11/1992 | Klaus | 415/171.1 |
| 5,531,564 | 7/1996 | Anttonen et al. | 415/104 |

FOREIGN PATENT DOCUMENTS 4-116696  10/1992  Japan .

*Primary Examiner*—Edward K. Look
*Assistant Examiner*—Ninh Nguyen
*Attorney, Agent, or Firm*—Jacobson, Price, Holman & Stern, PLLC

[57] ABSTRACT

A pump comprises a housing having a shaft bore and a pump chamber, a bearing provided for an inner periphery of the shaft bore, a shaft rotatively supported by the shaft bore through the bearing, and a transporting member connected to one end portion of the shaft for transporting fluid by imparting mechanical energy to the fluid sucked in said pump chamber. The bearing is constituted as a sliding bearing, a first region of a sliding surface formed to the sliding bearing is communicated with a high-pressure portion to be formed so as to provide a high pressure when constructed as a fluid passage, while a second region of the sliding surface formed to the sliding bearing is communicated with a low-pressure portion to be formed so as to have a relatively lower pressure than that of the high-pressure portion when constructed as a fluid passage, so that the fluid is supplied to the sliding surface of said sliding bearing by the action of a differential pressure between the high-pressure portion and the low-pressure portion of the fluid passage so as to lubricate the sliding surface.

9 Claims, 13 Drawing Sheets

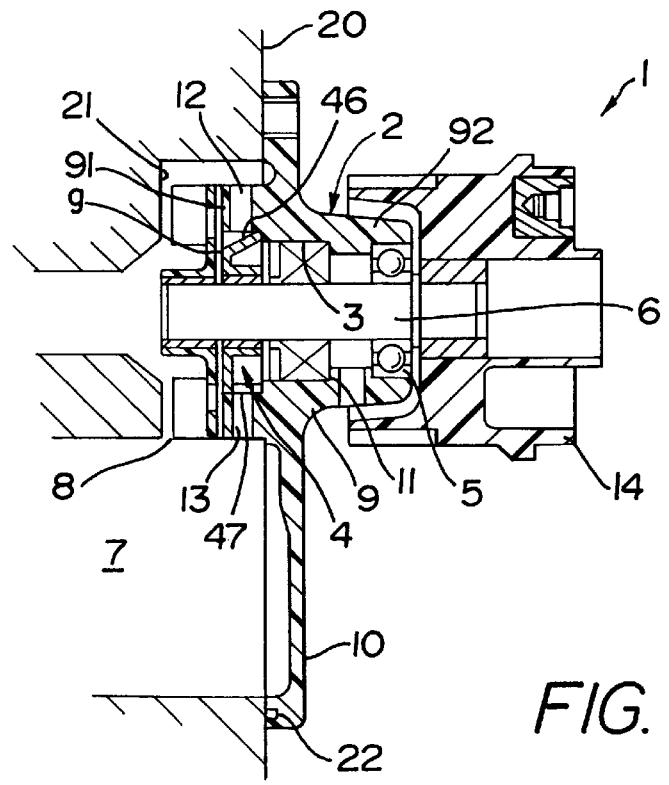
FIG. 1A
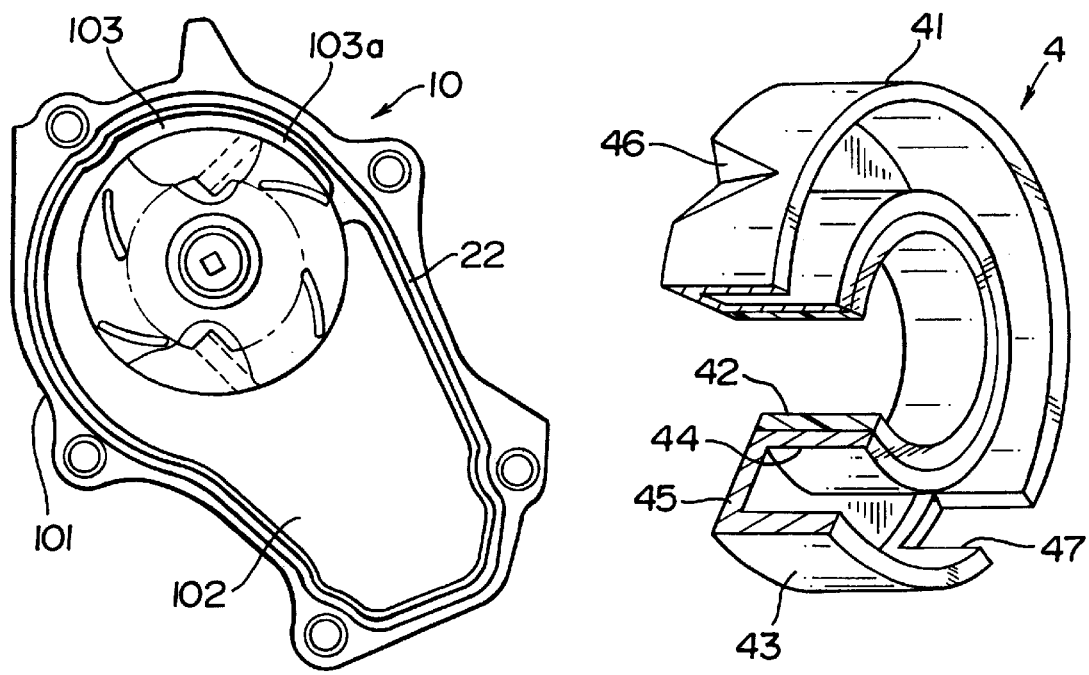
FIG. 1B
FIG. 1C

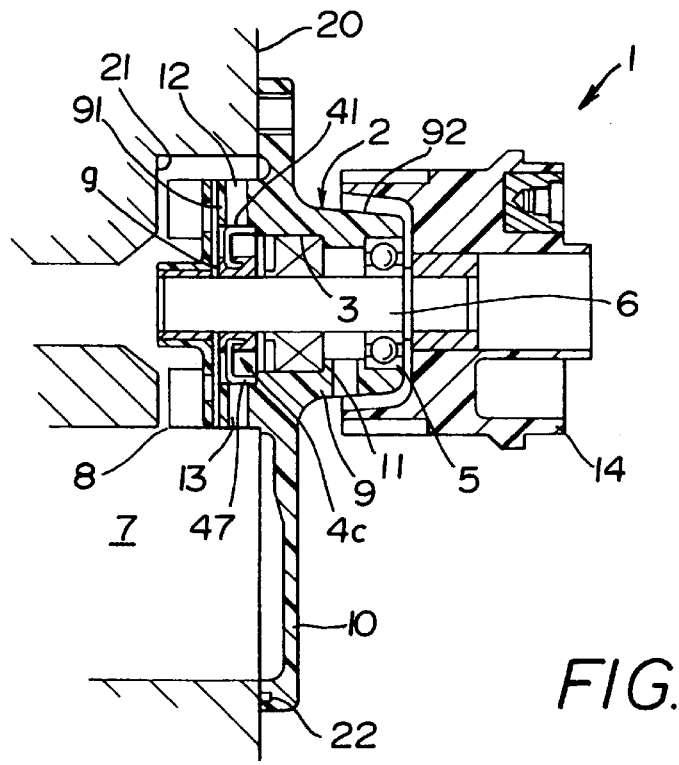
FIG. 7A
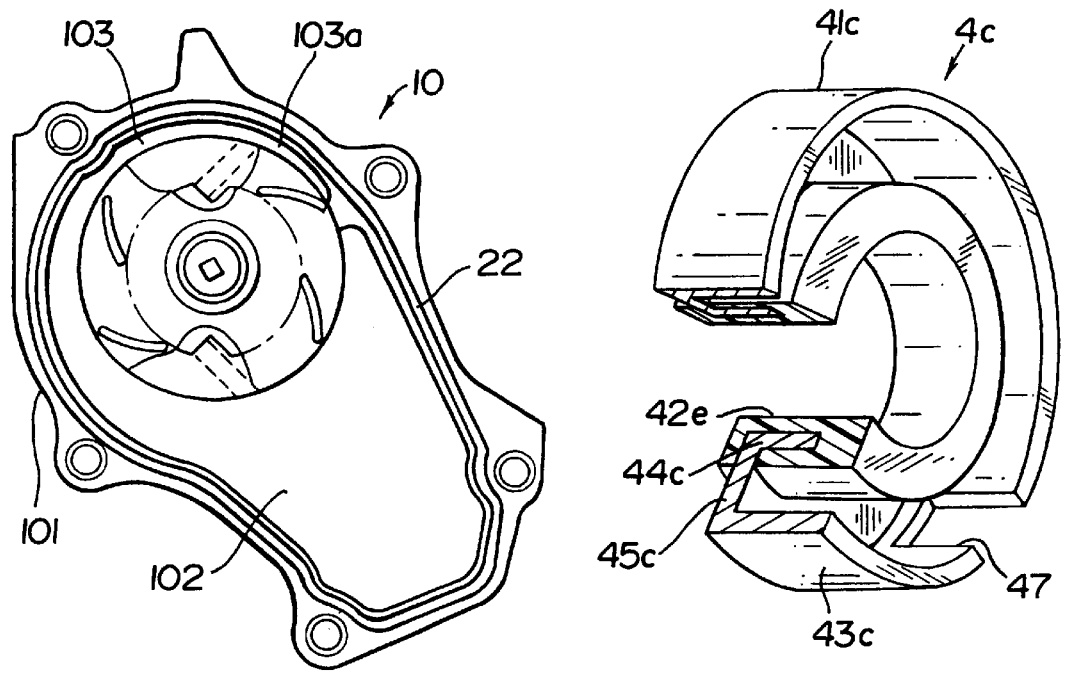
FIG. 7B
FIG. 7C

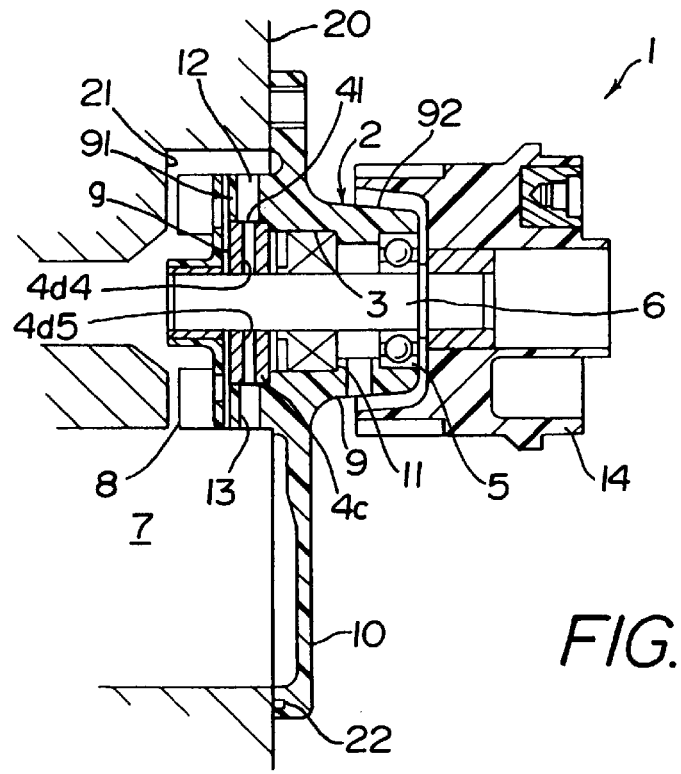
FIG. 12A
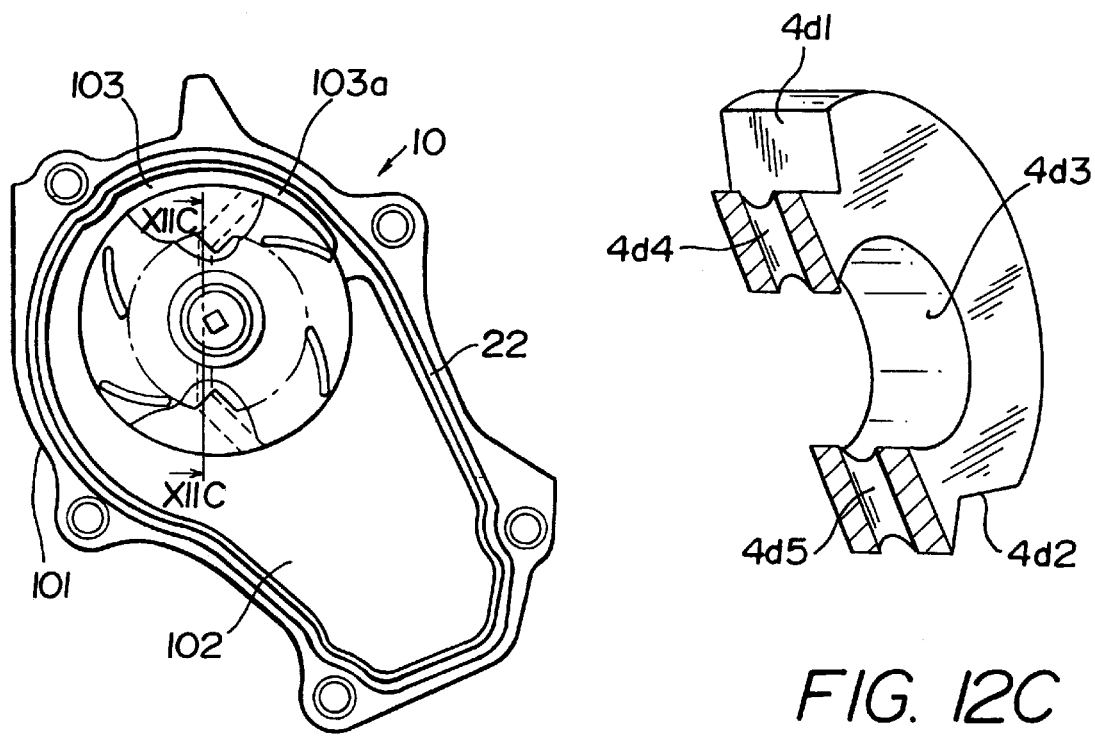
FIG. 12B
FIG. 12C

PUMP HOUSING HAVING A HIGH PRESSURE PORTION AND A LOW PRESSURE PORTION

BACKGROUND OF THE INVENTION

1. Field of the Invention

The present invention relates to a pump to be used as water pump or the like for cooling an engine of an automobile.

2. Description of the Related Art

As a conventional pump of this type, a pump shown in FIG. 13 is well known. The pump is constructed by comprising a housing 500 formed with a shaft bore 501, bearings 502, a shaft 503 rotatively supported by the inner peripheral portion of the shaft bore 101 through the bearings 502, wherein an impeller 505 to be inserted into a pump chamber 504 is connected to one end portion of the shaft 503. As the bearing 502, a rolling (roller) bearing has been used.

In recent years, however, there arise a great demand for forming the pump so as to have a light weight and a small size. In order to satisfy this demand, there have been made trials for lightening the weight of the pump by replacing materials for constituting the pump members such as housing 500 or the like by resin. However, due to existence of the rolling bearing, there is a limit for lightening the weight of the pump.

As a countermeasure for solving this problem and further lightening the weight of the pump, there has been made an investigation about using a sliding bearing in place of the rolling bearing. However, in case of the sliding bearing, a sliding surface thereof is liable to wear, so that there is posed a problem of durability of the pump being lowered.

SUMMARY OF THE INVENTION

The present invention had been achieved for solving the problems encountered in the prior art, and an object of the present invention is to provide a pump capable of increasing the wear resistance of a bearing by using a sliding bearing as the bearing and by supplying fluid in a pump chamber to a sliding surface of the sliding bearing.

In order to achieve the object described above, the present invention provides a pump comprising a housing having a shaft bore and a pump chamber, a bearing provided for an inner periphery of the shaft bore, a shaft rotatively supported by the shaft bore through the bearing, and a transporting member connected to one end portion of the shaft for transporting fluid by imparting mechanical energy to the fluid sucked in the pump chamber, wherein the bearing is constituted as a sliding bearing, a first region of a sliding surface formed to the sliding bearing is communicated with a high-pressure portion to be formed so as to provide a high pressure when constructed as a fluid passage, while a second region of the sliding surface formed to the sliding bearing is communicated with a low-pressure portion to be formed so as to provide a relatively lower pressure than that of the high-pressure portion when constructed as a fluid passage, so that the fluid is supplied to the sliding surface of the sliding bearing by the action of a differential pressure between the high-pressure portion and the low-pressure portion of the fluid passage, thereby to enable to lubricate the sliding surface.

According to the present invention, when a driving force is transmitted to the shaft and the transporting member such as impeller provided in the pump chamber is rotated, the fluid flows through the fluid passage. By the action of the differential pressure between the high-pressure portion and the low-pressure portion of the fluid passage, the fluid is supplied to the sliding surface of the sliding bearing thereby to lubricate the sliding surface. As described above, the sliding surface of the sliding bearing is lubricated by the fluid, so that wear of the sliding surface can be effectively prevented. As a result, it becomes possible to increase a durability of the pump and to effectively cool the frictional heating to be caused at the sliding surface.

In another aspect of this invention, there is also preferably provided a pump in which the housing is provided with an inlet port and an outlet port for communicating an outer peripheral interfitting portion of the sliding bearing with the pump chamber, and the inlet port is opened to the high-pressure portion of the fluid passage formed in the pump chamber while the outlet port is opened to the low-pressure portion of the fluid passage formed in the pump chamber, and one side end in the axial direction as the first region of the sliding surface formed to the sliding bearing is communicated with the inlet port while the other side end in the axial direction as the second region of the sliding surface formed to the sliding bearing is communicated with the outlet port, so that the fluid is supplied to the sliding surface of the sliding bearing by the action of a differential pressure between the inlet port and the outlet port.

According to the structure described above, the fluid flows from the inlet port formed to the housing for communicating with the high-pressure portion in the pump chamber and flows into the outer peripheral interfitting portion of the sliding bearing. The fluid flowing into the interfitting portion is then supplied to the sliding surface between the sliding bearing and the shaft from one side end in the axial direction of the sliding surface and flows out from the other side end thereof. As a result, the fluid lubricates the sliding surface formed between the sliding bearing and the shaft and the fluid then flows out from the outlet port formed to the housing and flows into the low-pressure portion in the pump chamber. Since the inlet port and the outlet port are formed to the housing per se, any other particular pipe or tube is not required. As a result, the pump can be assembled in a small size.

In still another aspect of this invention, there can be also preferably provided a pump in which a suction port or a delivery port for sucking or delivering the fluid is provided to a side portion opposing to the pump chamber so as to be apart from the sliding bearing provided to the housing, while a communicating bore for communicating the suction port or the delivery port with the pump chamber is formed to the sliding bearing, so that the fluid is transported through the communicating bore by the rotation of the transporting member provided in the pump chamber. The fluid is supplied to the sliding surface of the sliding bearing by the action of a differential pressure to be caused between both ends of the communicating bore.

According to the structure described above, in a case where the suction port is formed to the side portion opposing to the pump chamber so as to be apart from the sliding bearing provided to the housing, the fluid is sucked into the pump chamber through the communicating bore. In this case, one side portion of the communicating bore opposing to the pump chamber functions as a high-pressure portion while the other side portion of pump chamber side functions as a low-pressure portion, so that the fluid is supplied to the sliding surface of the sliding bearing by the action of the differential pressure between the high-pressure portion and the low-pressure portion.

On the other hand, in a case where the delivery port is formed to the side portion of the pump chamber, the fluid is transported from the pump chamber into the housing through the communicating bore and then delivered from the delivery port. In this case, one side portion of the communicating bore of the pump chamber side functions as a high-pressure portion while the other side portion opposing to the pump chamber functions as a low-pressure portion, so that the fluid is supplied to the sliding surface of the sliding bearing by the action of the differential pressure between the high-pressure portion and the low-pressure portion.

As described above, the fluid flow to be transported by the pump passes through the communicating bore formed to the sliding bearing, and the fluid is supplied to the sliding surface of the sliding bearing by the action of the differential pressure caused in course of the communicating bore, so that a high lubricating effect can be obtained.

In still another aspect of this invention, there can be also preferably provided a pump in which the shaft is formed with a communicating bore for communicating an end portion of a side of the pump chamber with said one side end in the axial direction of the sliding surface formed to the sliding bearing.

According to this structure, it becomes possible to supply the fluid from the pump chamber to the sliding surface of the sliding bearing and to discharge the fluid from the sliding surface of the sliding bearing to the pump chamber through the communicating bore formed to the shaft. In addition, a centrifugal force generated by the rotation of the shaft can be utilized as a function of transporting the fluid.

In still another aspect of this invention, there can be also preferably provided a pump in which the housing is provided with an inlet port and an outlet port for communicating an outer peripheral interfitting portion of the sliding bearing with the pump chamber, and the inlet port is opened to the high-pressure portion of the fluid passage formed in the pump chamber while the outlet port is opened to the low-pressure portion of the fluid passage formed in the pump chamber, and the sliding bearing is formed with a first communicating bore for communicating the first region of the sliding surface formed to the sliding bearing with the inlet port, and a second communicating bore for communicating the second region, which is apart from the first region in circumferential direction, of the sliding surface formed to the sliding bearing with the outlet port.

According to this structure, by the action of the pressure difference of the fluids supplied to the first and second regions that are formed so as to be apart from each other in the circumferential direction of the sliding surface formed to the sliding bearing, the fluid passes through the regions, whereby the sliding surface can be lubricated.

Further, when the sliding surface of the sliding bearing is formed with a groove for introducing the fluid into the sliding surface, the lubricating effect can be effectively enhanced.

In still another aspect of this invention, there can be also preferably provided a pump in which two bearings are provided in axial direction so as to be apart from each other, and one bearing provided at a side of the pump chamber is constituted as a sliding bearing while another bearing provided at a side opposing to the pump chamber is constituted as a rolling bearing. A sealing member for sealing a gap between the shaft bore formed to the housing and the shaft is provided at a portion between the sliding bearing and the rolling bearing.

According to this case, the fluid supplied from the pump chamber through the inlet port lubricates the sliding surface formed between the sliding bearing and the shaft, and then the fluid is discharged from the outlet port formed to the housing toward the low-pressure portion of the pump chamber. The fluid discharged from the sliding surface of the sliding bearing to a side portion opposing to the pump chamber is sealed by the sealing member, so that the fluid would not reach the rolling bearing portion.

In still another aspect of this invention, there can be also preferably provided a pump in which two sliding bearings are provided in the axial direction so as to be apart from each other, and one side end in the axial direction of the sliding surface formed to one sliding bearing is communicated with the inlet port, while the other end in the axial direction of the sliding surface of the sliding bearing is communicated with the outlet port.

According to this case, the fluid flows along a space formed between the two sliding bearings provided to the inner periphery of the housing, so that the housing can be effectively cooled.

In still another aspect of this invention, there can be also preferably provided a pump in which an inner peripheral portion of the shaft bore formed to the housing and an outer cylindrical portion of the sliding bearing supported by the inner peripheral portion of the shaft bore are formed to be spherical, and the sliding bearing is swingably supported with respect to the inner peripheral portion of the shaft bore formed to the housing.

According to this structure, the axial direction of the rolling bearing can be controlled by inclining an entire rolling bearing so as to have the same axial direction with respect to an inclination degree of the shaft, so that a bearing pressure of the sliding surface can be controlled to be uniform, and the wearing of the sliding surface can be effectively mitigated.

In still another aspect of this invention, there can be also preferably provided a pump in which the sliding surface comprises a sliding portion contacting to a surface of the shaft and a sliding portion being apart from the surface of the shaft.

According to this structure, an amount of the fluid to be supplied to the sliding surface of the sliding bearing can be increased to further improve the cooling effect and the lubricating effect.

BRIEF DESCRIPTION OF THE DRAWINGS

For a better understanding of this invention and to show how the same is carried out, reference is made, by way of preferred embodiment, to the accompanying drawings, in which:

FIG. 1A is a cross sectional view showing a pump of a first embodiment according to the present invention, FIG. 1B is a plan view showing an impeller side of the pump shown in FIG. 1A, and FIG. 1C is a perspective view partially in section showing a sliding bearing;

FIG. 7A is a cross sectional view showing a pump of a sixth embodiment according to the present invention, FIG. 7B is a plan view showing an impeller side of the pump shown in FIG. 7A, and FIG. 7C is a perspective view partially in section showing a sliding bearing;

FIG. 12A is a cross sectional view showing a pump of a ninth embodiment according to the present invention FIG. 12B is a plan view showing an impeller side of the pump shown in FIG. 12A, and FIG. 12C is a perspective view partially in section showing a sliding bearing.

DESCRIPTION OF THE PREFERRED EMBODIMENTS

Hereinafter, preferred embodiments of the present invention will be described with reference to the accompanying drawings.

[First Embodiment]

Figure 2:
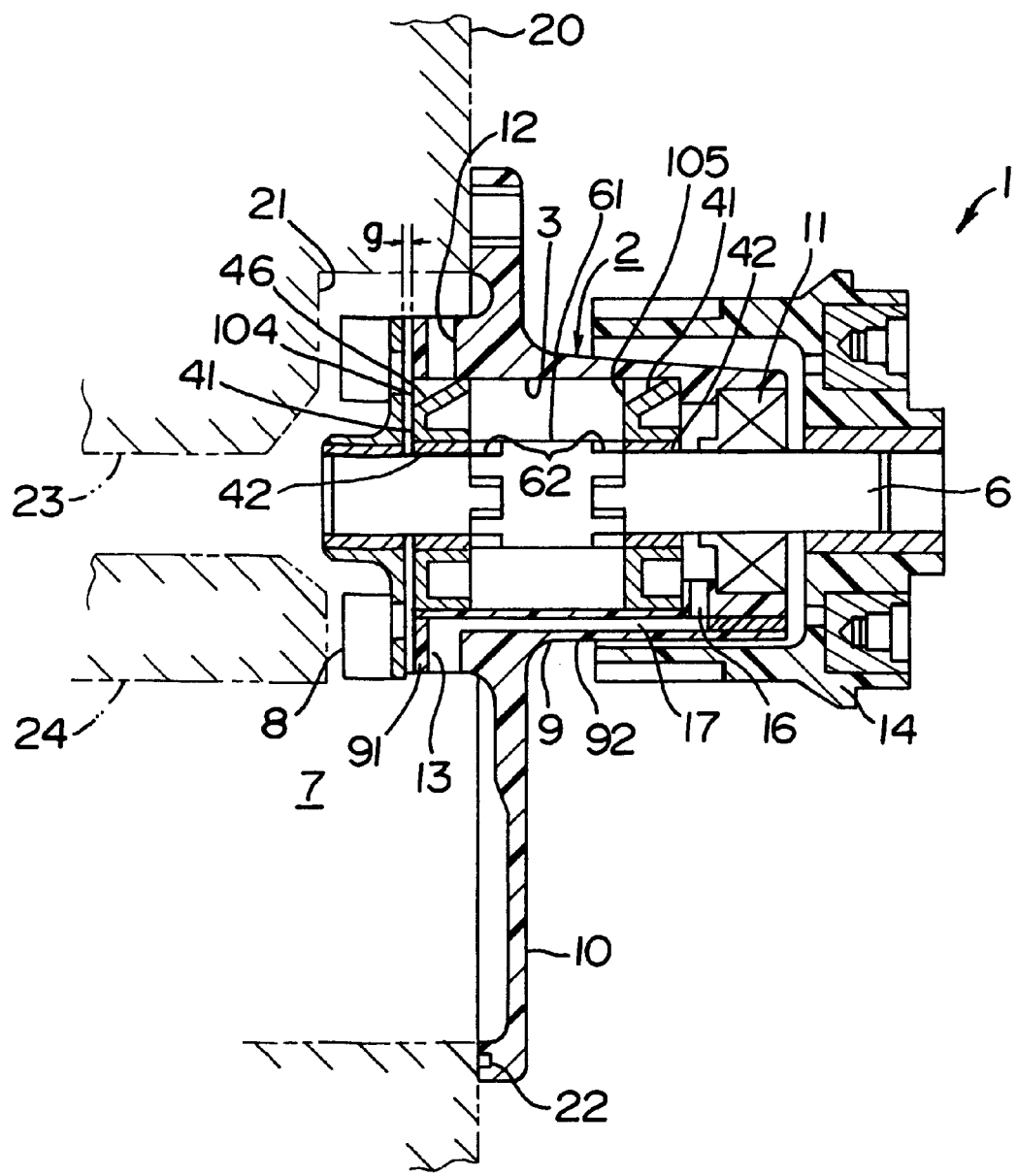
FIG. 2 is a cross sectional view showing a pump of a second embodiment according to the present invention.

FIGS. 1 and 2 exemplarily show a pump of a first embodiment according to the present invention in which the pump is applied as a water pump for cooling an engine of an automobile.

This water pump 1 comprises a housing 2 having a shaft bore 3 and a pump chamber 7, a sliding bearing 4 and a rolling (roller) bearing 5 provided to an inner periphery of said shaft bore 3 so as to be apart from each other, a shaft 6 rotatively supported by the shaft bore 3 through the sliding bearing 4 and the rolling bearing 5, and an impeller 8 or the like as a transporting member connected to one end portion of the shaft 6 so that the impeller 8 is inserted into the pump chamber 7. When the impeller 8 rotates, mechanically rotational energy is imparted to fluid, whereby the fluid is transported.

The housing 2 is constructed as an integrated molding composed of resin, and comprises a cylindrical portion 9 having the shaft bore 3 formed so as to penetrate therethrough and a flanged structure lid portion 10 extending from a midst of the cylindrical portion 9. The cylindrical portion 9 has a stepped structure comprising a large-diametered portion 91 to be inserted into the pump chamber 7 and a small-diametered portion 92 extending to a side opposing to the pump chamber. The lid portion 10 is integrally formed to a boundary portion between the large-diametered portion 91 and the small-diametered portion 92. The small-diametered portion 92 has a tapered-shape so that an outside diameter of the portion 92 is gradually decreased in a range from a side of the pump chamber 7 to a side opposing to the pump chamber 7.

The lid portion 10 comprises a circular portion 101 and a wide portion 102, and the shaft bore 3 of the cylindrical portion 9 is slightly eccentric from a center of the circular portion 101. A portion between an outer periphery of the impeller 8 and an inner periphery of the circular portion 101 is formed with a spiral flow passage 103 of which width is gradually widened so that one end portion of the spiral flow passage 103 in radial direction has a minimum width while the other end portion has a maximum width.

This lid portion 10 is fixed to an objective member 20 such as an engine block or the like by means of a fixing member such as bolt or the like. The objective member 20 is formed with a recessed portion 21 for the pump chamber, and the recessed portion 21 is closed by the lid portion 10 whereby the pump chamber 7 tightly closed by the recessed portion 21 and the lid portion 10 is formed. A boding surface between the lid member 10 and the objective member is sealed by means of gasket 22.

The sliding bearing 4 and the rolling bearing 5 are apart from each other in the axial direction, and the sliding bearing 4 is provided to a side of the pump chamber 7 while the rolling bearing 5 is provided to a side opposing to the pump chamber 7. A sealing member 11 for sealing the shaft bore 3 of the housing 2 and the shaft 6 is provided to a portion between the sliding bearing 4 and the rolling bearing 5.

The sliding bearing 4 is interfitted and fixed to the inner periphery of the large diametered cylindrical portion 91 of the housing 2 formed to the pump chamber 7. This large diametered cylindrical portion 91 is provided with an inlet port 12 and an outlet port 13 for communicating the outer peripheral interfitting portion of the sliding bearing 4 with the pump chamber 7. The inlet port 12 is opened to a high-pressure (highly pressurized) portion to be formed so as to provide a high pressure when constituted as fluid passage in the pump chamber 7, while the outlet port 13 is opened to a low-pressure portion to be formed so as to provide a low pressure (pressure relatively lower than the high pressure) when constituted as fluid passage.

In case of the pump using the impeller 8 as like this embodiment, the fluid has a large flow velocity and the largest fluid pressure at the vicinity of the minimum width portion 103a of the spiral flow passage 103, so that the inlet port 12 is opened to the minimum width portion 103a of the spiral flow passage 103, while the outlet port 13 is opened to the wide portion 102.

Further, one side end in the axial direction as the first region of the sliding surface formed to the sliding bearing 4 is communicated with the inlet port 12 while the other side end in axial direction as the second region of the sliding surface formed to the sliding bearing 4 is communicated with the outlet port 13, so that the fluid is supplied to the sliding surface of the sliding bearing 4 by the action of a differential pressure between the inlet port 12 and the outlet port 13.

As shown in FIG. 1C, the sliding bearing 4 is constituted by comprising a metal ring 41 having a U-shaped section which opens toward a side opposing to the pump chamber, and a resin liner portion 42 to be bonded to an inner periphery of the metal ring 41. The metal ring 41 has a U-shaped section which opens toward a side opposing to the pump chamber, and comprises an outer cylindrical portion 43, an inner cylindrical portion 44, and an end surface portion 45 for connecting both edge portions of the outer cylindrical portion 43 and the inner cylindrical portion 44. The resin liner portion 42 is bonded to the inner periphery of the inner cylindrical portion 44.

As material for constituting this resin liner portion 42, various materials such as PEEK, PPS, PSF, PEI, phenol resin or the like can be used. Among these materials, when the wear resistance is taken into consideration, phenol resin may be preferable.

The outer cylindrical portion 43 of the metal ring 41 of the sliding bearing 4 is fluid-tightly interfitted into the inner periphery of the large diametered cylindrical portion 91 of the housing 2. At an outer peripheral portion of the outer cylindrical portion to which the inlet port 12 corresponds is provided with the recessed portion 46. The recessed portion 46 is opened to an end portion of the outer cylindrical portion 43 at a side of the pump chamber 7, while closed at the other end portion at a side opposing to the pump chamber 7. In addition, at a portion of the outer cylindrical portion 43 to which the outlet port 13 corresponds is provided with a cutout portion 46. The side opposing to the pump chamber 7 is communicated with the outlet port 13 through the cutout portion 47.

In place of this cutout portion 47, a recessed portion similar to one provided to the side of the inlet port 12 may be also formed. In this case, however, it is required to form the recessed portion so as to open at the side opposing to the pump chamber 7 and to close at the side of the pump chamber 7. A size of the recessed portion 46 shall be set on the basis of a minimum flow rate required for cooling and lubricating.

On the other hand, an end surface portion 45 of the metal ring 41 is almost flush with an end surface of the large diametered portion 91 at a side of the pump chamber 7. Further, an outside diameter of the impeller 8 is almost equal to that of the large diametered portion 91. The impeller 8, the end surface of the large diametered portion 91 and the end surface portion 45 of the metal ring 41 are opposing through a predetermined gap g.

In this embodiment, although the sliding bearing 4 is constructed by two members of the metal ring 41 and the resin liner portion 42, the sliding bearing 4 can be also constructed by only one member composed of resin. As like this embodiment, when the bearing is constructed by two members of the metal ring 41 and the resin liner portion 42 as well as the flow passages of the fluid for lubricating are formed by providing the recessed portion 46 and the cutout portion 47 to the metal ring 41, a structure of the flow passages can be easily formed through a press-molding process of the metal ring 41.

In this embodiment, the metal ring 41 is formed so as to have the recessed portion 46 and the cutout portion 47 through the press-molding process, and thereafter, the resin liner portion 42 is insert-molded through by an insert-molding process.

Note, as the material for constituting the sliding bearing 4, it is not limited to resin, and metal ceramic or the like can be also used.

On the other hand, the rolling bearing 5 is disposed between an opening end portion of the small diametered cylindrical portion 91 formed to the cylindrical portion 9, the opening end portion being a side opposing to the pump chamber and a midst of the shaft 6. A pulley 14 constituting a wrapping-type driving mechanism is fixed to an end portion further extending from the end portion of the small diametered cylindrical portion 91 toward a side opposing to the pump chamber. A belt (not shown) is wrapped on this pulley 14 thereby transmitting the driving force.

A radial load applied to the shaft 6 through the belt is mainly supported by the rolling bearing 5, and an excessive large radial load caused by a tensile force of the belt would not apply to the sliding bearing 4. In particular, in the case of the structure shown in the figure, the rolling bearing 5 is located at just below a wrapping position of the belt for the pulley 14. According to the structure described above, the radial load to be applied to the sliding bearing 4 becomes to be an almost self-weight of the shaft 5. Therefore, the radial load is hardly applied.

As the wrapping-type driving mechanism, not only a combination of the pulley and belt but also a combination of a sprocket and a chain can be also used. Further, any other driving force transmitting mechanism may be also used.

In this embodiment, when the driving force is transmitted to the shaft 6 through the belt and the pulley 14 thereby to rotate the shaft 6 together with the impeller 8 provided in the pump chamber 7, the fluid is sucked into the pump chamber 7 through a first flow passage 23 of the objective member 20 thereby to form a vortex flow through the spiral flow passage 103, so that the fluid is delivered to a second flow passage 24.

At this time, a minimum width portion 103a of the spiral flow passage 103 with which the inlet port 12 formed to the housing 2 is communicated becomes a high pressure, while a region from an outlet of the spiral flow passage 103 to the wide portion 102 becomes a low pressure.

Due to this differential pressure, the fluid flows from the inlet port 12 into the outer circumferential interfitting portion of the sliding bearing 4. Then, the fluid flows from the recessed portion 46 formed to the outer circumference of the metal ring 41 of the sliding bearing 4 and flows through the end surface portion 45 of the metal ring 41 thereby to be supplied to the sliding surface between the resin liner portion 42 and the shaft 6.

A part of the supplied fluid moves to the wide portion 102 having a low pressure through a gap g formed between the end surface portion 45 and the impeller 8, and the other part of the fluid flows out in an axial direction towards a side of the pump chamber while the fluid lubricates the sliding surface, then the fluid flows from the outlet port 13 towards a low pressured portion in the pump chamber 7 through the cutout portion 47 formed to the outer cylindrical portion 43 of the metal ring 4.

As described above, since the sliding surface of the sliding bearing 4 is lubricated by the fluid, the sliding surface can be prevented from wearing, and durability of the pump can be improved.

In addition, it becomes possible to effectively cool the frictional heating to be caused at the sliding surface between the resin liner portion 42 and the shaft 7 by the action of the fluid.

Further, since the inlet port 12 and the outlet port 13 are formed to the housing 2 per se, any other particular pipe or tube is not required. As a result, the pump can be assembled in a small size.

It is preferable that the sliding surface of the sliding bearing 4 is formed with a groove for introducing the fluid into the sliding surface by the action of the rotation of the shaft 7. According to this structure, the lubricating effect can be effectively enhanced.

In addition, the fluid flowing out from the sliding surface of the sliding bearing towards a side opposing to the pump chamber is sealed by a sealing member 11, so that the fluid would not reach the the rolling bearing 5. As a groove, a groove may be formed so as to linearly extend in the axial direction, or a spiral groove having a screw-pump function may be also formed.

As described above, the fluid reaches the sealing member 11 through the sliding bearing 4 and a pressure of the fluid is reduced by the sliding bearing 4, so that the sealing member 11 is not limited to a sealing member for high pressure, and a lip-type seal can be used thereby to completely seal the leakage of the fluid. In other words, the sliding baring 4 can reduce the pressure of the fluid to a pressure level at which a lip seal can seal the leakage of the fluid.

In this regard, the sealing member 11 is not limited to the lip-type seal, and not only a mechanical seal but also the other various sealing members are also applicable.

Although this embodiment is constructed so that the fluid flows along the sliding surface formed between the sliding bearing 4 and the shaft 6 so as to flow the fluid from the side of the pump chamber to the side opposing to the pump chamber, there can be also applied a structure in which the fluid flows from the side opposing to the pump chamber towards the side of the pump chamber. In this case, the sealing member achieves no pressure-reducing effect, so that it is effective to use a sealing member for a high pressure as the sealing member.

[Second Embodiment]

FIG. 2 shows a pump of a second embodiment according to the present invention.

Although two bearings are used in this second embodiment, both one bearing for a side of the pump chamber and the other bearing for a side opposing to the side of the pump chamber are constituted as sliding bearings, respectively.

Namely, one side end in the axial direction of a sliding surface of a first sliding bearing 104 as one bearing is communicated with an inlet port 12, while the other side end in the axial direction of a sliding surface of a second sliding bearing 105 as the other bearing is communicated with an outlet port 13.

According to this structure, the fluid flows from the inlet port 12 formed to the housing 2, then the fluid flows through the sliding surface of the first sliding bearing 104 provided at the side of the pump chamber 7, and the fluid is supplied to the sliding surface of the second sliding bearing 105 provided at the side opposing to the side of the pump chamber 7. After the fluid has lubricated the sliding surface of the second sliding bearing 105 provided at the side opposing to the side of the pump chamber 7, the fluid is then discharged to a low pressure side in the pump chamber 7 through the outlet port 13 formed to the housing 2.

Further, at a side portion, which is further apart from the pump chamber, of the second sliding bearing 105 disposed at the side opposing to the side of the pump chamber is provided with a sealing member 11 for sealing a gap between a small diametered cylindrical portion 92 formed to the housing 2 and the shaft 6.

The structures of the first and second sliding bearings 104 and 105 are basically the same as those of the first embodiment shown in FIG. 1C, and each of the sliding bearings comprises a metal ring 41 having a U-shaped cross section so as to open toward a side opposing to the side of the pump chamber, and a resin liner portion 42 integrally bonded to an inner periphery of the metal ring 41. However, at the outer cylindrical portion 43 of the metal ring 41 formed to the first sliding bearing 104 is formed with only a recessed portion 46 corresponding to the inlet port 12, and there is not formed with a cutout portion corresponding to the outlet port 13.

An outer periphery of the outer cylindrical portion 43 of the metal ring 41 formed to the second sliding bearing 105 is not particularly required to be formed with the recessed portion or the cutout portion.

Further, the small diametered cylindrical portion 92 of the housing 2 is formed with a second outlet port 16 which is opened to a portion between the second sliding bearing 105 and the sealing member 11, while a thick portion of the small diametered cylindrical portion 92 is provided with a circulating passage 17 for communicating the second outlet port 16 with the outlet port 13 formed to the large diametered cylindrical portion 91 provided at a side of the pump chamber 7.

In the case of this second embodiment, the fluid flows through a space formed between the two sliding bearings 104 and 105 disposed to the inner periphery of the housing 2, so that the housing 2 can be cooled by the fluid to be introduced from the pump chamber 7.

Further, the first and second sliding bearings 104 and 105 are positioned through the abutment against both sides of a stepped portion of a large diametered portion 61 formed at the midst of the shaft 6. A plurality of cutout grooves 62 are partially formed to the stepped portion of the large diametered portion 61 so that the sliding surface is opened to the stepped portion.

Furthermore, there can be also adapted a structure in which the inlet port 12 and the outlet port 13 are separately formed and the outlet port 13 is communicated with a high-pressure side while the inlet port 12 is communicated with a low-pressure side so that the fluid flows from the second sliding bearing 105 as one sliding bearing toward the first sliding bearing 104 as the other sliding bearing.

The structures and functions of the elements or parts of the second embodiment other than those described above are substantially the same as those in the first embodiment, so that these elements or parts are not described herein by adding the same reference numerals to the corresponding elements or parts.

[Third Embodiment]

Figure 3A:
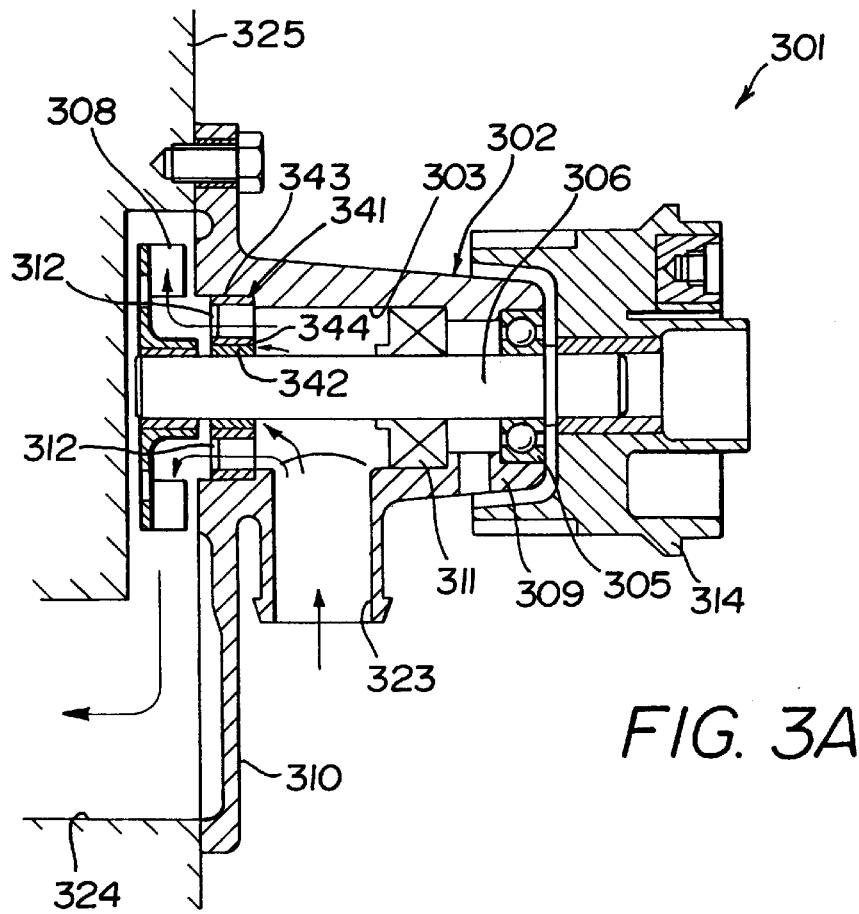
FIG. 3A is a view showing a pump of a third embodiment according to the present invention.
Figure 3B:
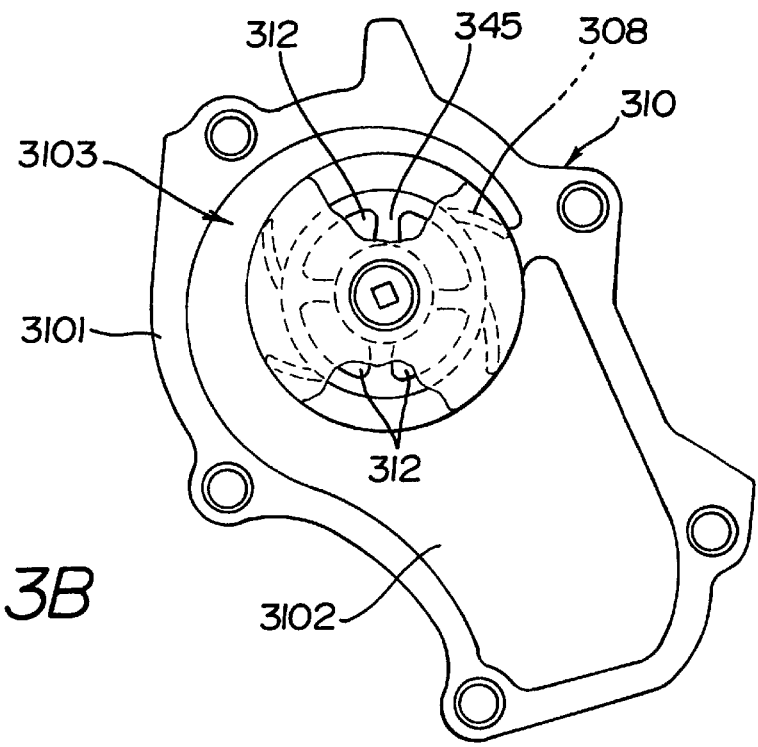
FIG. 3B is a plan view showing an impeller side of the pump.

FIG. 3 shows a pump of a third embodiment according to the present invention.

A pump 301 is also a water pump for cooling an engine as the same way as in the first embodiment, and the pump 301 is constructed so as to comprise a housing 302 having a shaft bore 303 and a pump chamber 307, a sliding bearing 304 and a rolling bearing 305 provided to an inner periphery of the shaft bore 303 so as to be apart from each other, a shaft 306 rotatively supported by the shaft bore 303 through the sliding bearing 304 and the rolling bearing 305, and an impeller 308 or the like as a transporting member connected to one end portion of the shaft 6 so that the impeller 308 or the like is inserted into the pump chamber 307. In addition, as in the same way as shown in FIG. 1, a pulley 314 is fixed to the other end of the shaft 306.

The housing 302 is constructed as an integrated molding composed of resin, and comprises a cylindrical portion 309 having the shaft bore 303 formed so as to penetrate therethrough and a flange-shaped lid portion 310 extending from one end of this cylindrical portion 309. An outer circumferential shape of the cylindrical portion 309 is a tapered-shape so that an outside diameter of the portion 309 is gradually decreased in a range from a side of the pump chamber 307 to a side opposing to the pump chamber 7.

The lid portion 310 comprises a circular portion 3101 and a wide portion 3102, and the shaft bore 303 of the cylindrical portion 309 is slightly eccentric from a center of the circular portion 3101. A portion between an outer periphery of the impeller 308 and an inner periphery of the circular portion 3101 is formed with a spiral flow passage 3103 of which width is gradually widened so that one end portion of the spiral flow passage 103 in the radial direction has a minimum width while the other end portion has a maximum width.

The sliding bearing 304 and the rolling bearing 305 are apart from each other in the axial direction, and the sliding bearing 304 is provided to a side of the pump chamber 307 while the rolling bearing 305 is provided to a side opposing to the pump chamber 307. A sealing member 311 for sealing the shaft bore 303 of the housing 302 and the shaft 306 is provided to a portion between the sliding bearing 304 and the rolling bearing 305.

In case of the third embodiment, a suction port 323 for sucking the fluid is formed to a portion at a side opposing to the pump chamber, the portion is apart from the sliding bearing 304 provided to the housing 302, i.e., the suction port 323 is provided to a portion between the sliding bearing 304 and the sealing member 311. In addition, the sliding bearing 304 is formed with a communicating bore 312 for communicating the suction port 323 with the pump chamber 307, so that the fluid is sucked in an axial direction into the pump chamber 307 through the suction port 323 and the communicating bore 312 by the rotation of the impeller 308 provided in the pump chamber 307. Accordingly, a side of the suction port in the axial direction of the sliding surface of the sliding bearing 304 becomes a high-pressure portion H, while a side of the pump chamber 307 in the axial direction becomes a low-pressure portion L.

The sucked fluid is transported to the wide portion 3102 while the fluid is pressed to a flow passage wall of the spiral flow passage 3103 by a centrifugal force caused by the rotation of the impeller 308. Then the fluid flows out towards a flow passage 324 formed in the objective member 320, the flow passage 324 being communicated with the wide portion 3102.

Figure 4A:
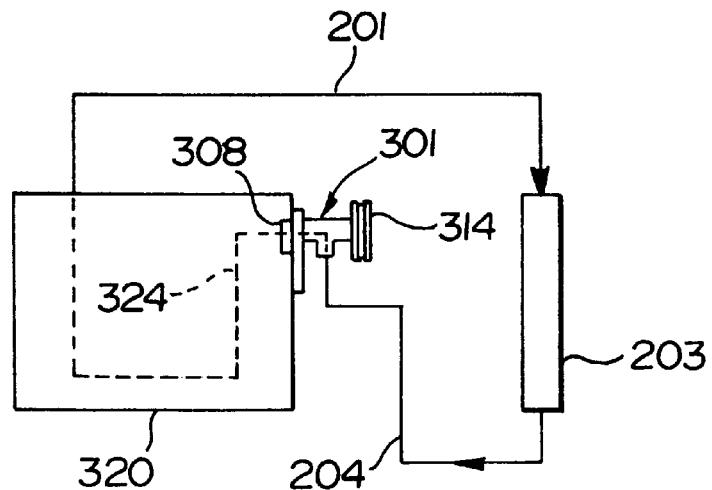
FIG. 4A is a view showing a piping arrangement for the pump shown in FIG. 3.

FIG. 4 shows one example of a piping arrangement of a cooling system for an engine or the like to which this pump is applied.

In the third embodiment, heat generated to the objective member 20 such as an engine block is absorbed by the fluid through cooling flow passages formed in the engine or the like. The heated fluid is transported to a radiator 203 through a return passage 201 and the fluid is cooled by the radiator 203. Then, the cooled fluid is supplied to the suction port 323 of the pump through a supply passage 204. Accordingly, it can be said that the sliding surface of the sliding bearing 304 is formed in main flow passage for the fluid.

Figure 4B:
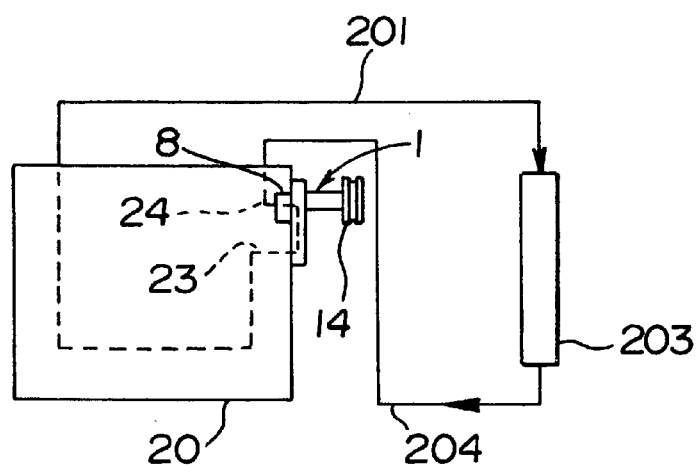
FIG. 4B is a view showing a piping arrangement for the pump shown in FIGS. 1 and 2.

In this regard, in the first and second embodiments as shown in FIG. 4B, the supply passage 204 from the radiator 203 is connected to the objective member 20 such as engine or the like, and this objective member 20 is formed with the supply passage 204 communicating with the pump chamber 7. In this point, the first and second embodiments are different from the third embodiment.

An inclination of a blade of the impeller 308 used in the third embodiment is opposite to those of the first and second embodiments, and the objective member 20 is not formed with a suction port but formed with a delivery port 324 communicating with the wide portion.

The sliding bearing 304 is interfitted and fixed to the inner periphery of the housing 302 so as to be provided beside the pump chamber 7. The sliding bearing 304 is constituted by comprising a metal ring 341 having a U-shaped in cross section which opens toward a side opposing to the pump chamber, and a resin liner portion 342 to be bonded to an inner periphery of the metal ring 341. The metal ring 341 has a U-shaped in cross section which opens toward a side opposing to the pump chamber, and comprises an outer cylindrical portion 343, an inner cylindrical portion 344, and an end surface portion 345 for connecting both edge portions of the outer cylindrical portion 343 and the inner cylindrical portion 344. The resin liner portion 342 is bonded to the inner periphery of the inner cylindrical portion 344. In addition, in this embodiment, a plurality of communicating bores 312 are formed to the end surface portion 345 in a circumferential direction.

The sliding bearing 304 may be constructed by only one member composed of resin. However, when the sliding bearing 304 is constructed by two members of the metal ring 341 and the resin liner portion 342, a structure of the flow passages can be easily formed through a press-molding process of the metal ring 341. In this embodiment, the metal ring 341 is formed so as to have the communicating bore 312 through the press-molding process. Thereafter, the resin liner portion 342 is insert-molded through an insert-molding process.

In the case of this embodiment, the fluid transported by the pump 301 passes through the communicating bore 312 of the sliding bearing 305. At this time, due to a differential pressure between before and behind the communicating bore 312, the fluid is supplied to the sliding surface of the sliding bearing 304 thereby to achieve a high lubricating effect.

As to a transporting direction of the fluid, the fluid can be also transported from a side of the sliding bearing 304 opposing to the side of the pump chamber 307 towards a side of the pump chamber 307, for example, by reversely rotating the impeller 308. In this case, the suction port 323 described above becomes a delivery port, while the delivery port 324 becomes a suction port.

Note, although each of the described embodiments has been explained with reference to a case where the present invention is applied to the water pump for circulating cooling water, the fluid to be transported is not limited to the cooling water, and the present invention is also applicable to various pumps for transporting fluids such as various chemicals or oils. In addition, although the present invention has been explained by taking an example in which the impeller is used as the transporting member, a type of a pump having vanes can be also used. Summing up to say, the present invention is applicable to pumps of type for transporting fluid by the rotation.

[Fourth Embodiment]

Figure 5A:
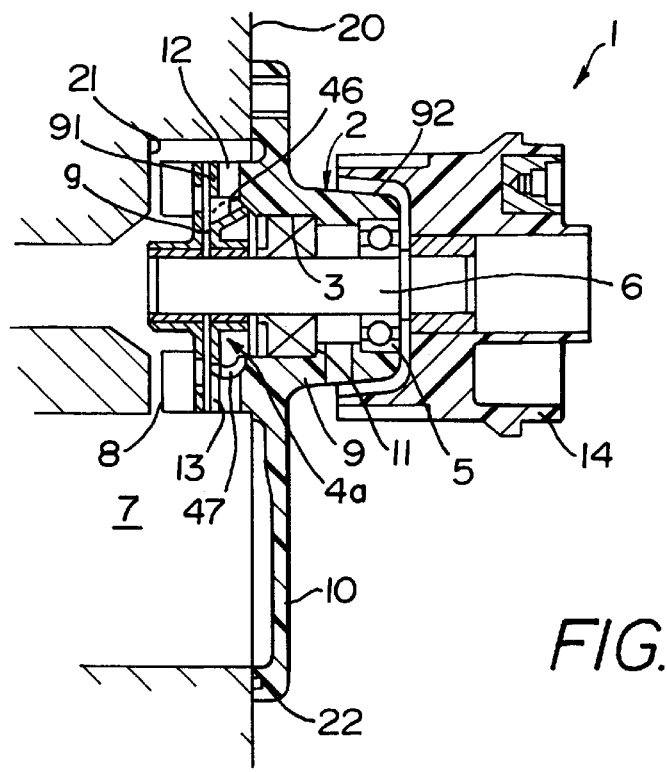
FIG. 5A is a cross sectional view showing a pump of a fourth embodiment according to the present invention.
Figure 5B:
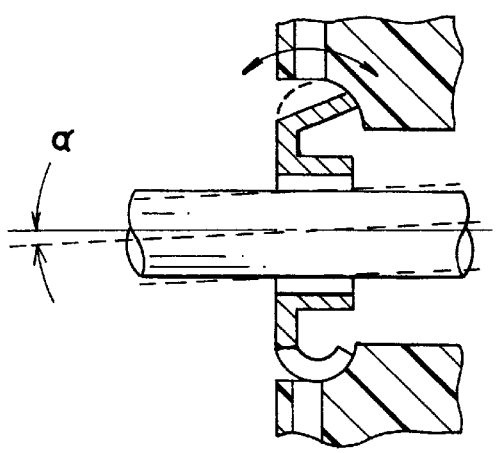
FIG. 5B is an enlarged view of the sliding bearing shown in FIG. 5A.
Figure 5C:
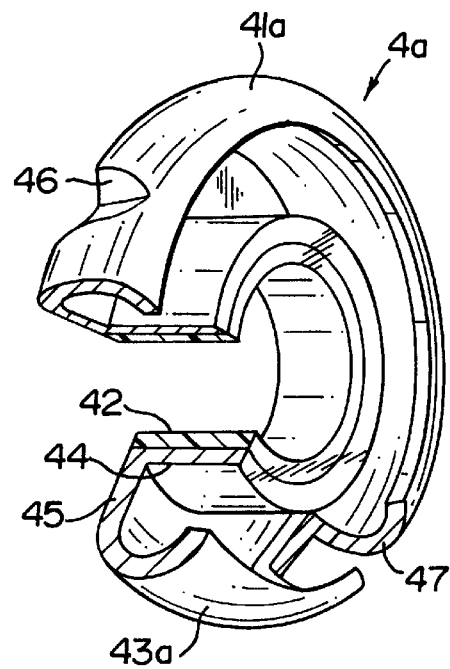
FIG. 5C is a perspective view partially in section showing the sliding bearing.

Each of FIGS. 5A, 5B, 5C shows a pump of the fourth embodiment according to the present invention. In these figures, the same reference numerals are added to elements or parts corresponding to the elements or parts of the first embodiment 1 shown in FIG. 1. A characteristic feature of this fourth embodiment resides in that an outer cylindrical portion 43a of the metal ring 41a provided for the sliding bearing 4a and an inner peripheral surface of the large diametered cylindrical portion 91 formed to the housing 2 are formed to be spherical, and the sliding bearing 4a is swingably supported by the spherical inner peripheral surface of the large diametered cylindrical portion 91 formed to the sliding bearing 4a.

In this case, an object of the swingable structure is to uniform a bearing pressure with respect to the resin liner portion when the shaft 6 is inclined from an axis of the housing 2 with a small inclination angle of a in relation to the rolling bearing 5. When the sliding bearing 4a supports the rotating shaft 6, the sliding bearing 4a is fixed in a predetermined attitude.

Accordingly, the sliding bearing 4a can support the shaft 6 while the sliding bearing 4a is normally swung in accordance with an eccentricity of the shaft 6. However, this structure is rather suitable for enabling to eliminate a coaxial displacement caused between the rolling bearing 5 and the sliding bearing 4.

FIG. 5C is a perspective view partially in cross section showing the sliding bearing 4a. In this sliding bearing 4a, the structures of the resin liner portion 42, the inner cylindrical portion 44, the end surface portion 45 and the recessed portion 46 are the same as those used in the sliding bearing 4 shown in FIG. 1, and exhibit the same functions and effects.

[Fifth Embodiment]

Figure 6A:
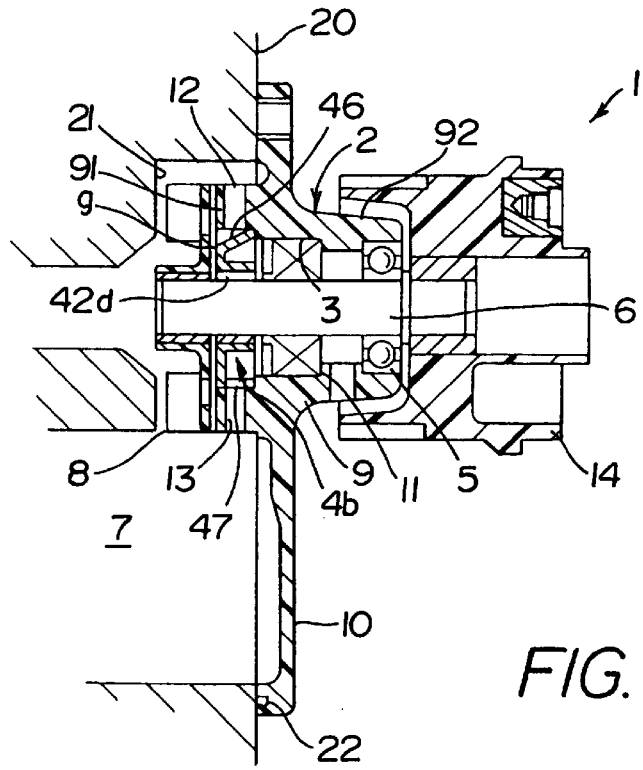
FIG. 6A is a cross sectional view showing a pump of a fifth embodiment according to the present invention.
Figure 6B:
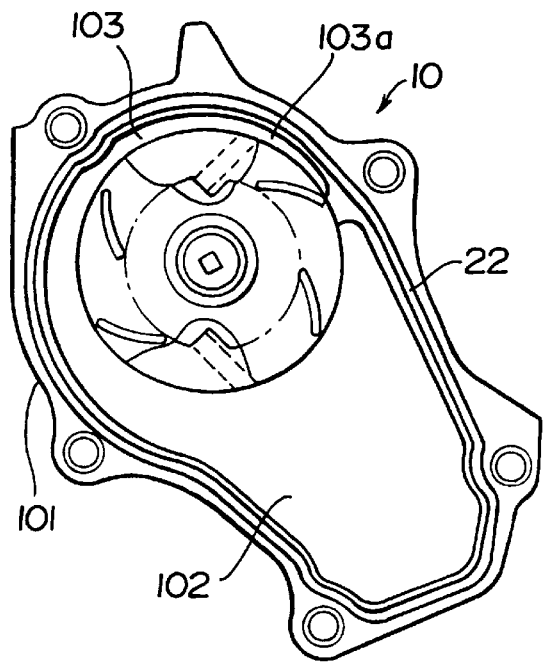
FIG. 6B is a plan view showing an impeller side of the pump shown in FIG. 6A.
Figure 6C:
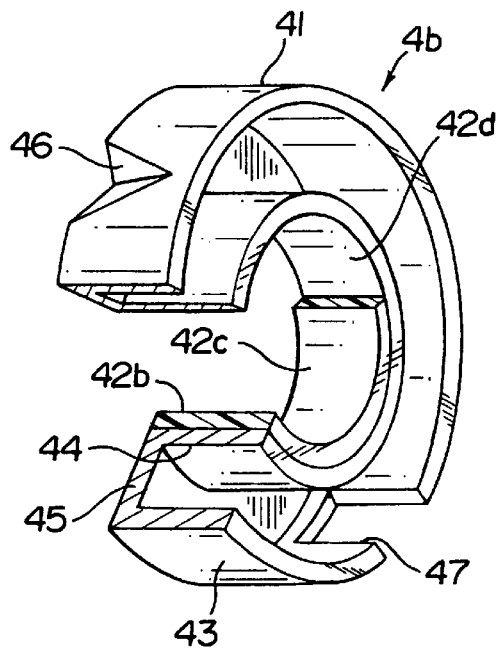
FIG. 6C is a perspective view partially in section showing a sliding bearing.

Each of FIGS. 6A, 6B, 6C shows a pump of a fifth embodiment according to the present invention. In these figures, the same reference numerals are added to elements or parts corresponding to those of the first embodiment shown in FIG. 1. A characteristic feature of this fifth embodiment resides in that a resin liner portion 42b to be bonded to an inner cylindrical portion 44 of the sliding bearing 4b is not formed to be a cylindrical shape but formed to be a circular-arc shape which is divided into almost halves, and an attaching direction of the resin liner portion 42b is a side where the shaft 6 can be supported, i.e., the side is a lower side of the inner cylindrical portion 44 in a state where the pump device stands in an erecting position.

Accordingly, the inner peripheral surface of the resin liner portion 42b constitutes a contacted sliding portion 42c for supporting the shaft 6, while a region having no resin liner portion 42b in the inner periphery of the inner cylindrical portion 44 constitutes a non-contacted sliding portion 42d.

When the pump is constructed as described above, it becomes possible to supply the fluid supplied through the inlet port 12 with a large amount toward the contacted sliding portion 42c of the resin liner portion 42b, thereby to enable to further improve the cooling effect and the lubricating effect. In addition, an amount of material for forming the circular-arc shaped resin liner portion 42b is small in comparison with that of the cylindrical resin liner portion, thereby to enable to contribute to a cost reduction.

By the way, an opening angle of the circular-arc shaped resin liner portion 42b with respect to the cylindrical shaped one is set to almost 180° in this embodiment. However, the angle can be also set to 180° or more, for example, 270° so as to limit a movement of the shaft 6. In another way, there can be adapted a structure in which a pair of resin liner portions each having the opening angle of 90° are vertically assembled to form right and left gaps which function as the non-contacted sliding portions. Further, it is also possible to use a resin liner portion of which a part of the inner peripheral surface is formed with groove constituting the noncontacted sliding portion, though the resin liner portion per se is formed to have a cylindrical shape.

[Sixth Embodiment]

Each of FIGS. 7A, 7B, 7C shows a pump of a sixth embodiment according to the present invention. In these figures, the same reference numerals are added to elements or parts corresponding to those of the first embodiment shown in FIG. 1. A characteristic feature of this sixth embodiment resides in that an inner cylindrical portion 44c of the metal ring 41c is covered with a resin liner portion 42e of the sliding bearing 4c.

The resin liner portion 42e is integrally formed with the metal ring 41c by being inserted thereinto when the metal ring 41c formed by press-working or the like is resin-molded.

The end surface portion 45c of the metal ring 41c is not flush with an end surface of the resin liner portion 42e of a side of the pump chamber 7, but positioned to a portion moved to a side opposing to the pump chamber 7, so that there is provided a gap larger than the gap g between a back surface of the impeller 8 and the end surface portion 45c. In this structure, the fluid from the inlet port 12 is introduced from the outer cylindrical portion 43c into a portion between the back surface of the impeller 8 and the end surface portion 45c. Thereafter, the fluid is supplied to the sliding surface of the sliding bearing 4c. Accordingly, the outer cylindrical portion 43c of the metal ring 41c is not required to be provided with the recessed portion 46 (see FIG. 1) for introducing the fluid from the inlet portion 12 to inside, though there arise no problem even if the recessed portion is provided. As a result, it becomes possible to improve a productivity at a time of working of the metal ring 41c and the resin insertion molding therefor.

[Seventh Embodiment]

Figure 8:
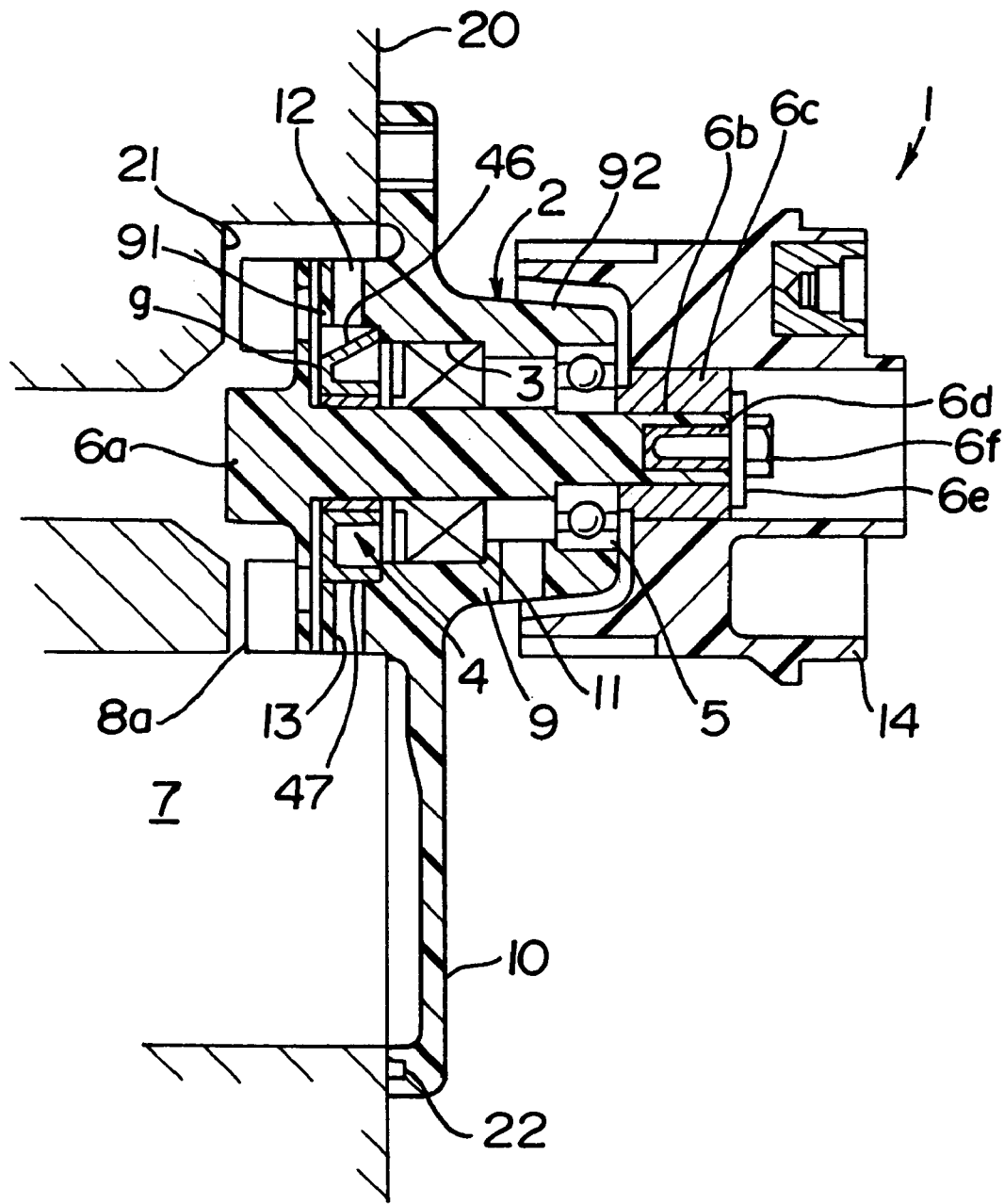
FIG. 8 is a cross sectional view showing a pump of a seventh embodiment according to the present invention.

FIG. 8 shows a pump of a seventh embodiment according to the present invention. In this figure, the same reference numerals are added to elements or parts corresponding to those of the first embodiment shown in FIG. 1. A characteristic feature of this embodiment resides in that a shaft 6a and an impeller 8a are integrally molded using a resin material.

An end portion of the shaft 6a, which is a side opposing to the pump chamber 7, is formed to have a reduced diameter so as to fix the rolling bearing 5, thereby to constitute a mounting portion 6b for mounting the rolling bearing 5. The rolling bearing 5 and a sleeve 6c are interfitted into the mounting portion 6b, and a bolt 6f is fastened to a stud 6d interfitted into the shaft 6a through a washer 6e, whereby the shaft 6a is fixed.

Further, in this seventh embodiment, the sliding surface of the sliding bearing 4 is constituted by the resin liner portion. However, since the shaft 6a is composed of the resin material, there can be also provided a structure in which the inner cylindrical portion of the metal ring is directly contacted to the shaft 6a without providing the resin liner portion to the sliding bearing 4, thereby to directly slide with the shaft 6a.

According to the structure described above, a number of parts or elements for the pump can be reduced, so that the assembling performance of the pump can be improved. The fixing method for the shaft 6a is not a press-fitting but a bolt-fastening. Therefore, even if deficiency or wear of the shaft 6a and the impeller 8a would occur, such element or part can be easily replaced by loosening the bolt 6f, thereby to improve the maintainability of the pump.

[Eighth Embodiment]

Figure 9A:
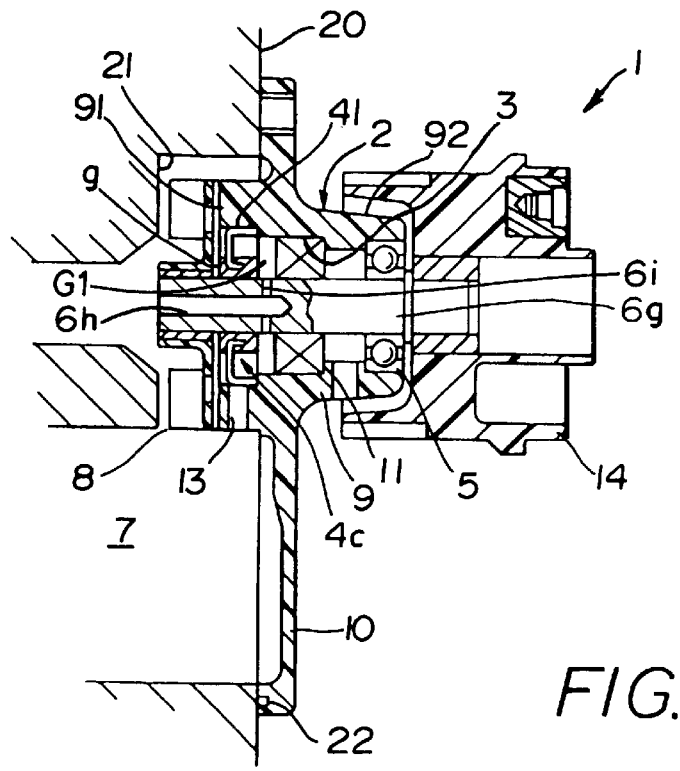
FIG. 9A is a cross sectional view showing a pump of an eighth embodiment according to the present invention.
Figure 9B:
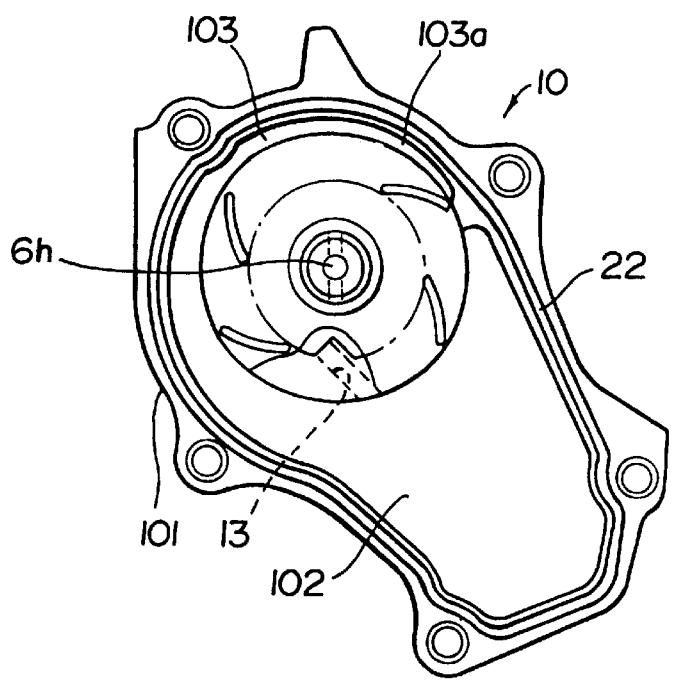
FIG. 9B is a plan view showing an impeller side of the pump shown in FIG. 9A.

Each of FIGS. 9A, 9B shows a pump of an eighth embodiment according to the present invention. In these figures, the same reference numerals are added to elements or parts corresponding to those of the sixth embodiment shown in FIG. 7. A characteristic feature of this eighth embodiment resides in that a shaft 6g is formed with a deep bore 6h extending from an end portion of the shaft 6g at a side of the pump chamber 7 towards a side opposing to the pump chamber 7, and the shaft 6g is formed with a radial direction bore 6i at a portion opposing to a gap G1 formed between the sliding bearing 4c and the sealing member 11, the radial direction bore 6i opened to the outside in the radial direction. In addition, the inlet port 12 for the large diametered cylindrical portion 91 and the cutout portion 47 for the outer cylindrical portion 43c of the metal ring 41 are not formed.

According to this structure, by virtue of the deep bore 6h and the radial direction bore 6i, the side of the pump chamber 7 is communicated with the gap G1 formed at a side of the sliding bearing 4c, the side being a side opposing to the pump chamber 7. When the shaft 6g is rotated, a centrifugal force occurs at the radial direction bore 6i, so that the fluid is transported to the gap G1 by the centrifugal force. As a result, the fluid is supplied to the sliding surface of the sliding bearing 4c from a side opposing to the pump chamber 7 towards a side of the pump chamber 7, i.e., a left direction in figure. Thereafter, the fluid is discharged from a gap g to a low-pressure side in the pump chamber 7 through the outlet port 13.

Though not shown, the pump can be also constructed so as to have a structure in which a position of the radial direction bore 6i is set to a position opposing to the gap g, the fluid is supplied from a side of the pump chamber 7 towards a side opposing to the pump chamber 7 i.e., a right direction in figure, and the fluid is discharged from the cutout portion 47 (not shown) formed to the outer cylindrical portion 43c through the outlet portion 13.

Figure 10:
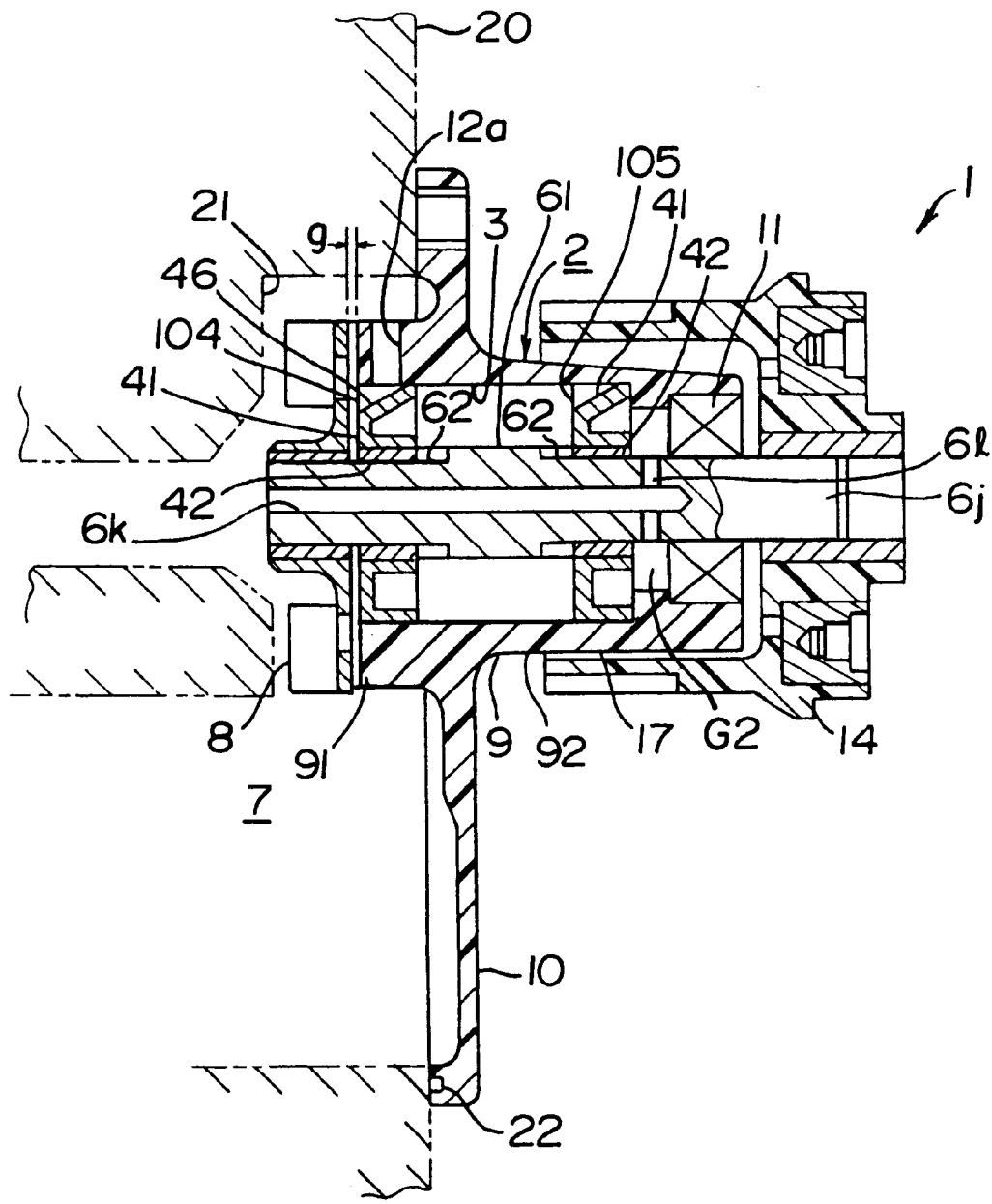
FIG. 10 is a cross sectional view showing a pump of the eighth embodiment according to the present invention.

FIG. 10 shows a water pump 1 further comprising a deep bore 6k and a radial bore 61 formed to the shaft 6j in addition to the structure of the water pump 1 of the second embodiment shown in FIG. 2. However, in this embodiment, the second outlet port 16 and the outlet port 13 formed to the small diametered cylindrical portion 92 of the housing 2 as shown in FIG. 2 become unnecessary, so that they are not provided.

In accordance with the rotation of the shaft 6J, the fluid is supplied to a gap G2 formed between the second sliding bearing 105 and the sealing member 11, and the fluid flows from a sliding surface of the second sliding bearing 105 towards a sliding surface of the first sliding bearing 104. As a result, the fluid is returned from the outlet port 12a (inlet port 12 in FIG. 2) to a side of the pump chamber 7.

In this regard, there can be also provided a structure by setting a high pressured side and a low pressured side in such a manner that a side of the outlet port 12a is constructed as a high pressured side so as to flow the fluid from the first sliding bearing 104 toward the second sliding bearing 105, and thereafter, the fluid is discharged through the radial direction bore 61 and the deep bore 6k.

Figure 11:
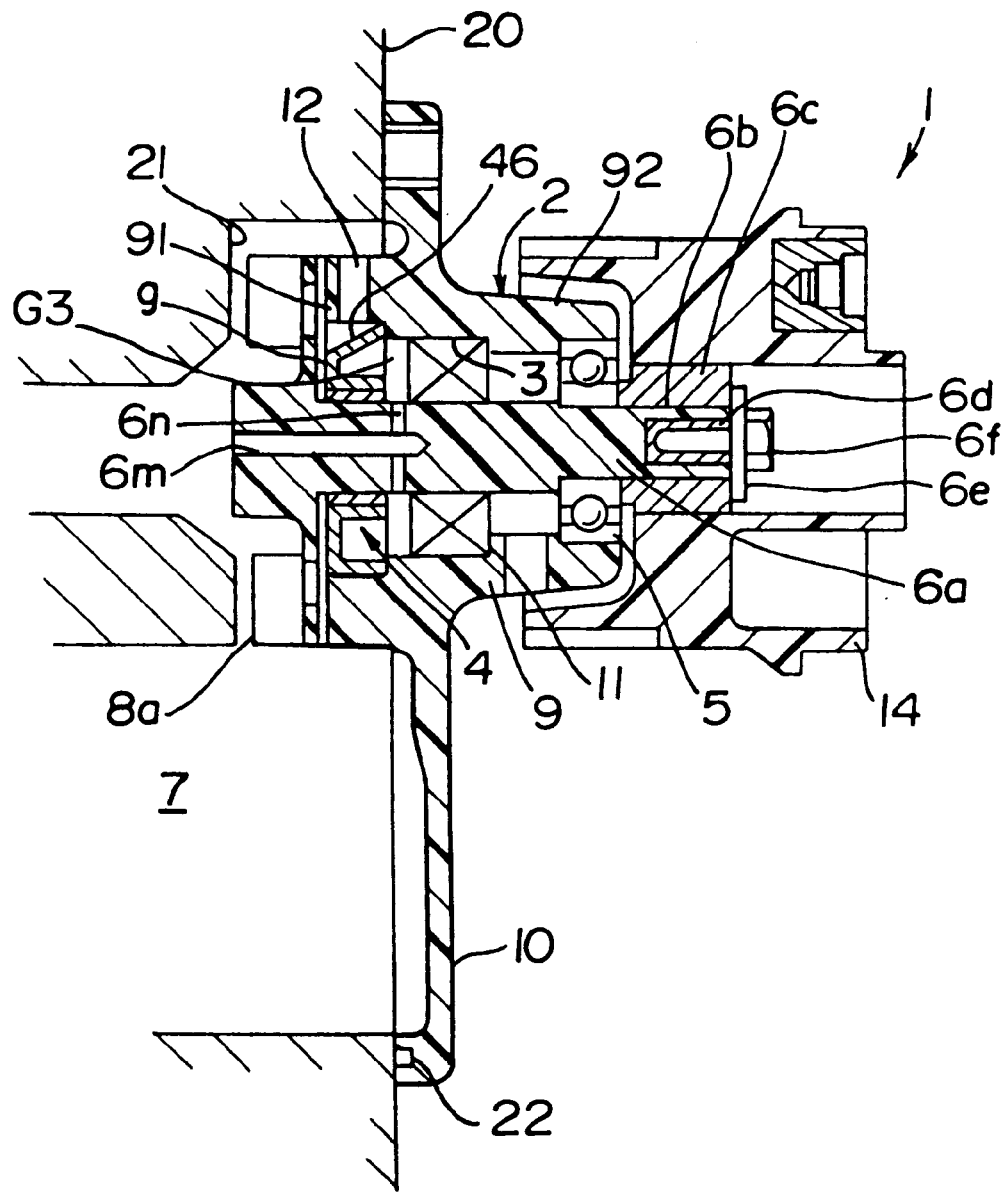
FIG. 11 is a cross sectional view showing a pump of the eighth embodiment according to the present invention.
Figure 13:
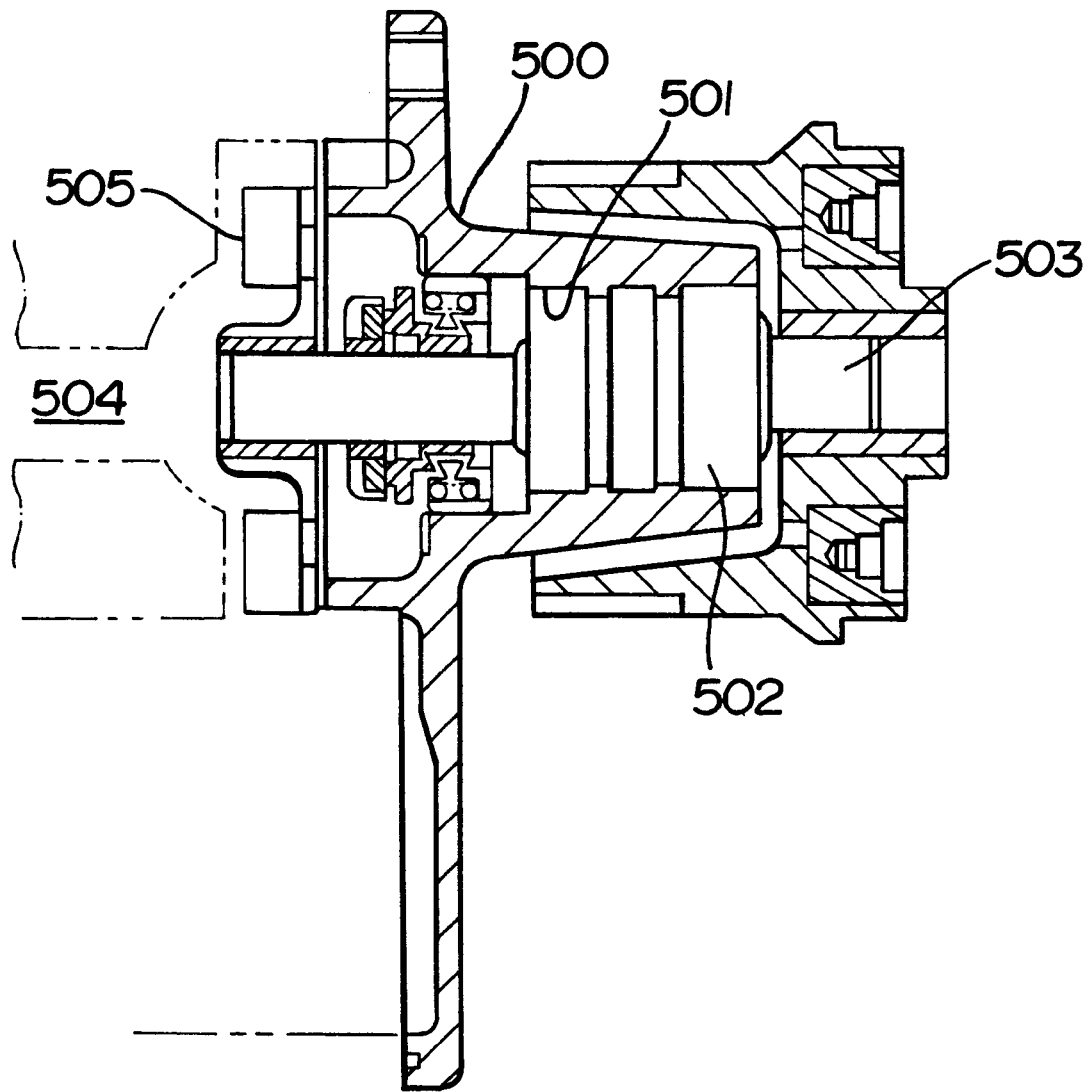
FIG. 13 is a cross sectional view showing a conventional pump.

FIG. 11 shows a water pump 1 which further comprises a deep bore 6m and a radial bore 6n formed to the shaft 6a in addition to the structure of the water pump 1 of the seventh embodiment shown in FIG. 8. However, in this embodiment, the outlet port 13 as shown in FIG. 8 becomes unnecessary, so that it is not provided.

In the same manner as in FIGS. 9 and 10, when the shaft 6a is rotated, a centrifugal force occurs at the radial bore 6n, so that the fluid is transported to the gap G3 by the centrifugal force. As a result, the fluid is supplied to the sliding surface of the sliding bearing 4 from a side opposing to the pump chamber 7 towards a side of the pump chamber 7, i.e., a left direction in figure. Thereafter, the fluid is discharged from a gap g to the pump chamber 7 through the outlet port 12b (the inlet port 12 in FIG. 8).

As described above, when the deep bore and the radial direction bore formed to the shaft are used as the communicating bore, it becomes possible to connect the sliding surface of the sliding bearing to the high-pressure side or low-pressure side of the flow passages of the pump, so that the fluid can be supplied to the sliding surface. In addition, a flow passage to be formed to the housing can be substituted for the deep bore and the radial direction bore, so that a working of the housing can be simplified. Further, the fluid discharged from the radial bore can increase an amount of fluid to be supplied to the sliding surface of the sliding bearing by the action of the centrifugal force caused by the rotation of the shaft.

In particular, in a case where the impeller and the shaft are integrally formed, it becomes possible to form the deep bore and the radial direction bore by shaping mold at the resin molding operation, thus contributing to improve the productivity and the cost reduction.

[Ninth Embodiment]

Each of FIGS. 12A, 12B, 12C shows a pump of a ninth embodiment according to the present invention. FIG. 12A is a cross sectional view showing a structure of the water pump 1, FIG. 12B is a view showing the water pump 1 as viewed from a side of the impeller 8 in axial direction, and FIG. 12C is a perspective view partially broken in section showing the sliding bearing 4d taken along the line XIIC—XIIC of FIG. 12B. In these figures, the same reference numerals are added to elements or parts corresponding to those of the first embodiment shown in FIG. 1.

The sliding bearing 4d in this embodiment is formed with cutout portions 4d1 and 4d2 each having a V-shape when observed from the axial direction at outer peripheral surfaces corresponding to an inlet port 12 and an outlet port 13. In addition, the sliding bearing 4d is also formed with a first and a second communicating bores 4d4 and 4d5 for communicating inclining surfaces of the cutout portions 4d1 and 4d2 with the sliding surface 4d3. Note, in this embodiment, regions of the sliding surface 4d3 to which the communicating bores 4d4 and 4d5 are opened are provided so as to be apart from each other in a circumferential direction with an apart angle of about 180°.

According to the structure described above, when the impeller 8 rotates, the inlet port 12 becomes a high-pressure side when constructed as a flow passage, while the outlet port 13 becomes a relatively low-pressure side. The fluid is supplied from the inlet port 12 to the sliding surface 4d3 of the sliding bearing 4d through the communicating bore 4d4. Then, the fluid passes through a gap formed between the sliding surface 4d3 and the shaft 6, so that the fluid flows from the outlet port 13 through the communicating bore 4d5 of a side opposing to the communicating bore 4d4 to a side of the pump chamber 7.

Accordingly, the sliding surface 4d3 of the sliding bearing 4d is lubricated. In addition, by the action of a differential pressure caused between the inlet port 12 and the outlet port 13, a flow of the fluid flowing along the sliding surface 4d3 in the circumferential direction shall occur, so that it becomes possible to perform an effective cooling.

As explained hereinabove, according to the present invention, by the action of the differential pressure between the high-pressured portion and the low-pressured portion in the fluid passages, the fluid is supplied to the sliding surface of the sliding bearing thereby lubricate the sliding surface.

Since the sliding surface of the sliding bearing is lubricated by the fluid, the sliding surface can be prevented from wearing, and durability of the pump can be improved.

In addition, it becomes possible to effectively cool the frictional heating to be caused at the sliding surface by the action of the fluid.

Further, if the inlet port and the outlet port are formed to the housing per se, any other particular pipe or tube are not required. As a result, the pump can be assembled in a small size.

When the sliding surface of the sliding bearing is formed with a groove for introducing the fluid into the sliding surface, the lubricating effect can be effectively enhanced.

When two bearings are provided in the axial direction so as to be apart from each other, and one bearing provided at a side of the pump chamber is constituted as a sliding bearing while another bearing provided at a side opposing to the pump chamber is constituted as a rolling bearing, and a sealing member for sealing a gap between the shaft bore formed to the housing and the shaft is provided at a portion between the sliding bearing and the rolling bearing, a radial load applied to the shaft is mainly supported by the rolling bearing, and an excessive large radial load would not apply to the sliding bearing.

As a result, the durability of the pump can be further improved in cooperation with the lubricating structure of the sliding bearing.

In addition, when two sliding bearings are provided in the axial direction so as to be apart from each other, the fluid flows along a space formed between the two sliding bearings provided to the inner periphery of the housing, so that an effect of cooling the housing can be obtained.

When a suction port for sucking the fluid is formed to a portion at a side opposing to the pump chamber, and the portion is apart from the sliding bearing provided to the housing so that the fluid is sucked into the pump chamber through the communicating bore formed to the sliding bearing, the fluid transported by the pump passes through the communicating bore formed to the sliding bearing. As a result, by the action of the differential pressure between the both sides of the communicating bore, the fluid is supplied to the sliding surface of the sliding bearing, thus realizing a high lubricating effect.

When the sliding bearing is swingably supported, a bearing pressure applied on the sliding surface of the sliding bearing can be controlled to be uniform, and the wearing of the sliding surface can be effectively mitigated.

By providing a contacted sliding portion and a non-contacted sliding portion to the sliding surface of the sliding bearing, an amount of the fluid to be supplied to the sliding surface of the sliding bearing can be increased, thus improving the cooling effect and the lubricating effect.

The communicating bore formed to the shaft can be used as the flow passage for supplying the fluid to the sliding surface of the sliding bearing. At this time, the communicating bore can also promote to supply the fluid by the centrifugal force applied to the communicating bore of the rotating shaft, whereby an amount of the fluid to be supplied to the sliding surface of the sliding bearing can be increased.

When the communicating bores connected to the regions apart from each other in axial direction of the sliding surface are provided, a flow of the fluid flowing along the sliding surface in the circumferential direction shall occur, so that it becomes possible to perform an effective lubricating and cooling performances.

It is to be noted that the present invention is not limited to the described embodiments and many other changes and modifications may be made without departing from the scopes of the appended claims.

What is claimed is:

1. A pump comprising a housing having a shaft bore and a pump chamber, a bearing provided for an inner periphery of the shaft bore, a shaft rotatively supported by the shaft bore through the bearing, and an impeller connected to one end portion of the shaft for transporting fluid by imparting mechanical energy to the fluid sucked in the pump chamber, the bearing being constituted as a sliding bearing, and said impeller being arranged off-set inside the housing and constructed such that a high-pressure portion and a low-pressure portion of lower pressure than the high-pressure portion being formed inside the pump chamber when a fluid passage is formed, a first region of a sliding surface formed to said sliding bearing being communicated with the high-pressure portion to be formed so as to provide a high pressure when constructed as the fluid passage, while a second region of the sliding surface formed to said sliding bearing being communicated with the low-pressure portion to be formed so as to have a relatively lower pressure than that of said high-pressure portion when constructed as the fluid passage, so that the fluid is supplied to the sliding surface of said sliding bearing by the action of a differential pressure between the high-pressure portion and the low-pressure portion of the fluid passage so as to lubricate said sliding surface.

2. A pump according to claim 1, wherein said housing is provided with an inlet port and an outlet port for communicating an outer peripheral interfitting portion of said sliding bearing with the pump chamber and said inlet port is opened to the high-pressure portion of the fluid passage formed in the pump chamber while said outlet port is opened to the low-pressure portion of the fluid passage formed in the pump chamber and wherein one side end in an axial direction as the first region of said sliding surface formed to the sliding bearing is communicated with said inlet port while the other side end in axial direction as the second region of said sliding surface formed to the sliding bearing is communicated with said outlet port, so that the fluid is supplied to the sliding surface of said sliding bearing by the action of a differential pressure between the inlet port and the outlet port.

3. A pump according to the claim 1, wherein one of a suction portion for sucking the fluid and a delivery portion for delivering the fluid is provided to a side portion opposing to the pump chamber so as to be away from the sliding bearing provided to the housing, while a communicating bore for communicating one of the suction port arranged at the high-pressure portion and the delivery portion arranged at the low-pressure portion with the pump chamber is formed to the sliding bearing, so that the fluid is transported through the communicating bore by the rotation of the transporting member provided in the pump chamber and wherein said fluid is supplied to the sliding surface of the sliding bearing by the action of a differential pressure to be caused between both ends of said communicating bore.

4. A pump according to claim 1, wherein said shaft is formed with a communicating bore for communicating an end portion of a side of the pump chamber being the low-pressure portion with one end in an axial direction of the sliding surface formed to the sliding bearing being the high-pressure portion.

5. A pump according to claim 1, wherein said housing is provided with an inlet port and an outlet port for communicating an outer peripheral interfitting portion of said sliding bearing with the pump chamber and said inlet port is opened to the high-pressure portion of the fluid passage formed in the pump chamber while said outlet port is opened to the low-pressure portion of the fluid passage formed in the pump chamber and wherein said sliding bearing is formed with a first communicating bore for communicating said first region of the sliding surface formed to the sliding bearing with said inlet port, and a second communicating bore for communicating said second region, which is apart from said first region in a circumferential direction, of the sliding surface formed to the sliding bearing with said outlet port.

6. A pump according to claim 1, wherein two sliding bearings are provided in an axial direction so as to be apart from each other and one side end in the axial direction of the sliding surface formed to one sliding bearing of the two sliding bearings is communicated with the inlet port, while the other end in the axial direction of the sliding surface of the other sliding bearing of the two sliding bearings is communicated with the outlet port.

7. A pump according to claim 1, wherein an inner peripheral portion of the shaft bore formed to said housing and an outer cylindrical portion of the sliding bearing supported by said inner peripheral portion of the shaft bore are formed to be annular and said sliding bearing is swingably supported with respect to the inner peripheral portion of the shaft bore formed to said housing.

8. A pump comprising a housing having a shaft bore and a pump chamber, a bearing provided for an inner periphery of the shaft bore, a shaft rotatively supported by the shaft bore through the bearing, and an impeller connected to one end portion of the shaft for transporting fluid by imparting mechanical energy to the fluid sucked in the pump chamber, two bearings provided in an axial direction so as to be apart from each other, and one of said two bearings provided at a side of the pump chamber being constituted as a sliding bearing while another of said two bearings provided at a side opposing to the pump chamber being constituted as a rolling bearing and wherein a sealing member for sealing a gap between the shaft bore formed to the housing and the shaft being provided at a portion between the sliding bearing and the rolling bearing, and said impeller being arranged off-set inside the housing and constructed such that a high-pressure portion and a low-pressure portion of lower pressure than the high-pressure portion being formed inside the pump chamber when a fluid passage is formed, a first region of a sliding surface formed to the sliding bearing being communicated with the high pressure portion to be formed so as to provide a high pressure when constructed as the fluid passage, while a second region of the sliding surface formed to the sliding bearing being communicated with the low-pressure portion to be formed so as to have a relatively lower pressure than that of the high-pressure portion when constructed as the fluid passage, so that the fluid is supplied to the sliding surface of the sliding bearing by the action of a differential pressure between the high-pressure portion and the low-pressure portion of the fluid passage so as to lubricate the sliding surface.

9. A pump according to claim 1, wherein two bearings are provided in an axial direction so as to be apart from each other, and one bearing provided at a side of the pump chamber is constituted as sliding bearing while another bearing provided at a side opposing to the pump chamber is constituted as a rolling bearing and wherein a sealing member for sealing a gap between the shaft bore to the housing and the shaft is provided at a portion between the sliding bearing and the rolling bearing.

* * * * *